US007004747B2

(12) United States Patent
Asai (10) Patent No.: US 7,004,747 B2
(45) Date of Patent: Feb. 28, 2006

(54) MOLDING DIE AND MOLDING METHOD (75) Inventor: Ikuo Asai, Aichi-ken (JP)

(73) Assignee: Kabushiki Kaisha Meiki Seisakusho, Aichi-ken (JP)

( * ) Notice: Subject to any disclaimer, the term of this patent is extended or adjusted under 35 U.S.C. 154(b) by 308 days.

(21) Appl. No.: 10/438,048

(22) Filed: May 15, 2003

(65) Prior Publication Data

US 2003/0215540 A1 Nov. 20, 2003

(30) Foreign Application Priority Data

May 15, 2002 (JP) ............................. 2002-139480
Jan. 30, 2003 (JP) ............................. 2003-021330

(51) Int. Cl.
*B29D 11/00* (2006.01)
(52) U.S. Cl. ...................... 425/548; 425/552; 425/810; 425/DIG. 13
(58) Field of Classification Search ................ 425/547, 425/548, 552, 810, DIG. 13; 249/78
See application file for complete search history.

(56) References Cited

U.S. PATENT DOCUMENTS 4,208,574 A * 6/1980 Schafer ...................... 219/539
2002/0058084 A1 * 5/2002 Sandstrom et al. ......... 425/547

OTHER PUBLICATIONS

Abstract of Japan; Publication of JP 08-090624; Applicant: Meiki Co., Ltd; Inventor: Shimojo Shunichi; Publication Date: Apr. 9, 1996.
Abstract of Japan; Publication of JP 08-132498; Applicant: Ricoh Co., Ltd; Inventor: Sudo Katsunori et al.; Publication Date May 28, 1996.
Abstract of Japan: Publication of JP 10-034655; Applicant: Taiho Kogyo KK; Inventor: Kimoto Hidetoshi; Publication Date Feb. 10, 1998.
Abstract of Japan, Publication of JP 10-315257; Applicant. Meiki Co., Ltd. Inventor: Ogawa Akihiko; Publication Date: Dec. 2, 1998.
Abstract of Japan: Publication of JP 2001-315202: Applicant: Meiki Co.. Ltd: Inventor: Ogawa Akihiko: Publication Date: Nov. 13, 2001.

* cited by examiner

*Primary Examiner*—Donald Heckenberg
(74) *Attorney, Agent, or Firm*—Browdy and Neimark, PLLC (57) ABSTRACT

The transfer plate is energized and heated uniformly in the state in which the transfer plate heated through the electric resistance heating is separated slightly from the specular surface of the specular plate, then, immediately before the die is closed, the transfer plate is pressed against the specular surface to adhere thereto and, at the same time, the resin material is supplied to the cavity quickly and, after that, at the same time as the molded product is shaped completely, the transfer plate is de-energized so that the resin material in the cavity is quenched at the controlled temperature of the specular plate that is set to be lower than the heating temperature of the transfer plate.

11 Claims, 4 Drawing Sheets

MOLDING DIE AND MOLDING METHOD

BACKGROUND OF THE INVENTION

1. Field of the Invention

The present invention relates to a die structure and a molding method for performing a transfer molding process of a molded product, having a small thickness and a relatively large area, at a low pressure and with a reduced production cycle time.

2. Description of the Related Art

An injection molding die provided with a heating element for generating heat through electric resistance heating is disclosed, for example, in Japanese Unexamined Patent Publication No. Hei 8-90624. In this disclosed example, a stamper, which is comprised of nickel having a thickness of about 0.3 mm and which generates heat through electric resistance heating, is attached to either one of a stationary die and a movable die, which are combined as a pair, by means of an inner circumferential holding member and an outer circumferential holding ring, to which both electrodes of an AC power supply delivering 100–500 A at 1–5 V are connected. Then, a polycarbonate resin is injected into a cavity that is formed by the stationary die and the movable die abutting each other, wherein the stamper is first energized to increase the temperature of the stamper surface to 130° C. instantaneously so that flowability and transferability of the resin is increased and, after that, the electric power is turned off, and the temperature of the stamper is reduced by the controlled temperature of the die so that a disk substrate is formed. Here, in order to prevent leakage current, an insulating layer, such as a ceramic coating, a sapphire coating and the like, is formed on a specular surface to which the stamper is attached and on a surface inside the hole penetrating the inner circumferential holding member.

Further, a laminating apparatus comprising a heating element that generates heat through electric resistance heating is disclosed in Japanese Unexamined Patent Publication No. Hei 10-315257. In this disclosed example, a molded material is disposed between film elements attached to opposing surfaces of an upper plate and a lower plate disposed in an opposing manner so that the both plates can move close to and away from each other and a molding space, in which the molded material is enclosed with a frame element disposed on the lower plate, is created by bringing the upper plate and the lower plate close to each other, air is evacuated from the molding space while the volume of the molding space is kept unchanged and, in this state, compressed air is introduced through air intake paths provided in the upper and lower plates so as to pressurize the molded material via the both film elements so that the molded material is separated from the upper and lower plates, through which channels for a coolant are provided and, at the same time, electric power is supplied to a heating plate, which is a rectangular thin plate made of stainless steel sandwiched by two film elements, to generate heat for heating the molded material for a predetermined time period. After that, the air is evacuated through one of the air intake paths so that the molded material is brought into intimate contact with either the upper or lower plate which is cooled by the coolant and, at the same time, the heating plate is de-energized so that the molded material is cooled to form a finished product.

Still further, another laminating apparatus comprising a heating element that generates heat through electric resistance heating is disclosed, for example, in Japanese Unexamined Patent Publication No. 2001-315202. In this disclosed example, a product is molded in a vacuum laminating apparatus, wherein an upper plate and a lower plate that can move close to or away from each other as well as frames attached to the upper and lower plates are pressed together to create a vacuum chamber therebetween and, then, in the vacuum chamber, an upper board and a lower board, through each of which channels for cooling water are pierced, are provided so that the upper board and the lower board can move close to and away from the upper plate and the lower plate by means of cylinders and, further, an upper film element and a lower film element are attached to the upper plate and the lower plate, respectively and, at the same time, heating plates comprised of rectangular thin plates of stainless steel are disposed between the upper board and the upper film element as well as between the lower board and the lower film element, respectively. More specifically, the upper plate and the lower plate are moved away from each other and the upper board and the lower board are put into intimate contact with the upper plate and the lower plate, respectively, by means of the respective cylinders and, at the same time, air is evacuated through each vent hole provided in each of the upper plate and the lower plate to press each heating plate and each film element against the upper board and the lower board, respectively. Then, in such state, after the molded material is placed on the lower film element, the upper plate and the lower plate are brought near to each other so that the frames attached to the upper and lower plates, respectively, abut each other and, after that, the air is evacuated through evacuation holes provided in each frame while the frames are pressed together. After that, each vent hole is changed into a mode to open the chamber to the atmosphere or a mode to supply compressed air to the chamber and a molding process is performed at a predetermined pressure, temperature and time period by pressurizing the molded material between the upper film element and the lower film element via the upper heating plate and the lower heating plate, respectively, and, at the same time, the upper heating plate and the lower heating plate are energized to generate heat. Then, the upper board and the lower board are moved close to each other by means of the respective cylinders so that the upper board and the lower board are put into intimate contact with the respective heating plates and, at the same time, the heating plates are de-energized to reduce the temperature to a predetermined value. Then, each evacuation hole is opened to the atmosphere and, at the same time, the air is evacuated through each vent hole to press each heating plate and each film element against the upper board and the lower board, respectively, and, further, the upper board and the lower board are brought into intimate contact with the upper plate and the lower plate, respectively, and, after that, the upper plate and the lower plate are separated from each other so that the molded product can be taken out.

Still further, an optical disk molding apparatus comprising a heating element that generates heat through induction heating is disclosed in Japanese Unexamined Patent Publication No. Hei 8-132498. According to this disclosed example, in a configuration in which a stamper supporting section having a small heat capacity and a temperature control section having a large heat capacity are disposed so that these elements can move close to and away from each other, when a resin material is injected, the temperature control section is moved away from the stamper supporting section and is induction heated by means of an induction coil so that a temperature drop of the resin material can be prevented and thus the quality of the optical disk can be improved and, on the other hand, when the resin material is solidified, the temperature control section is brought into contact with the stamper supporting section so that the resin material can be solidified quickly and thus the productivity of the optical disk can be increased.

Still further, in Japanese Unexamined Patent Publication No. Hei 10-34655, there is disclosed a technique for improving the transferability in which a die surface abutting on a stamper is covered with an electric resistance heating layer and said electric resistance heating layer is energized to heat the stamper.

However, among the prior art techniques described above, with regard to the injection molding method disclosed in Japanese Unexamined Patent Publication No. Hei 8-90624, as the electrodes are disposed on the inner circumferential holding member and the outer circumferential holding ring, the current density is not uniform in the direction from the inner circumferential holding member to the outer circumferential holding ring or, in other words, from the center to the outer circumference and, consequently, the heating temperature of the stamper is not uniform from the inner radius to the outer radius of the disk and there is a problem in that a disk substrate without distortion cannot be manufactured and uneven transfer may occur. Further, in this example, in which the stamper is brought into intimate contact with the die so as to heat the stamper, as the heat is absorbed by the die, which is temperature controlled to a set value lower than the heating temperature of the stamper, there is another problem in that it is difficult to increase the stamper temperature quickly and, further, it is also difficult to control the heating temperature of the stamper surface to an optimal value.

Similarly, with regard to Japanese Unexamined Patent Publication No. Hei 10-34655, in the configuration in which the stamper abuts on the specular surface covered with the electric resistance heating layer so as to heat the stamper, as the heat is absorbed by the specular surface, which is temperature controlled to a set value lower than the heating temperature of the stamper, there is also a problem in that it is difficult to increase the stamper temperature quickly and, further, it is also difficult to control the heating temperature of the stamper surface to an optimal value.

On the other hand, in the vacuum laminating apparatus disclosed in Japanese Unexamined Patent Publication (Kokai) No. Hei 10-315257, after the molded product is pressurized and heated via the film elements by compressed air, the air is evacuated through one of the air intake paths and the molded material is brought into intimate contact with the cooled upper or lower plate via the film elements so that the molded material can be cooled and molded. However, such cooling method in which the film elements and the heating plate are manipulated cannot be applied to the compression molding method in which the molded material is filled in the cavity so that it is compressed and molded under high pressure. Further, in the vacuum laminating apparatus disclosed in Japanese Unexamined Patent Publication No. 2001-315202, when the molded product is cooled, the upper board and the lower board are moved closer to the heating plate, but, if such cooling method is applied to an injection molding die, a complicated apparatus will be needed and the cost will be increased and, further, such method has a drawback that the molding cycle time is longer because the heating plate is cooled by moving the upper board and the lower board close to the heating plate. Thus, such method is not suitable for the molding apparatus that must operate in a small space, with reduced cost and with a reduced production cycle time.

Still further, in Japanese Unexamined Patent Publication No. Hei 8-132498, the temperature control section is moved away from the stamper supporting section and is induction heated by means of the induction coil. However, in the induction heating, as the temperature rises more slowly than in the resistance heating, there is a drawback that the molding cycle time is long. Further, as the induction heating uses an electromagnetic coil, a space for disposing the electromagnetic coil is needed. Also, as the induction heating uses eddy currents to generate heat, a circular heating element can be heated uniformly, but a substantially rectangular heating element cannot be heated uniformly. Further, in this example, when the resin material is solidified after the injection process is completed, the movable die is pressed so that the stamper supporting plate abuts on the temperature control section. In the actual injection molding process, however, as the time to apply the pressure to the resin material may often be delayed, optical disks of good quality may not be molded.

SUMMARY OF THE INVENTION

Thus, in view of the above problems, it is an object of the present invention to provide a molding die and a molding method wherein a heating element having a substantially rectangular plate-like part that generates heat through electric resistance heating can be controlled so that the current density of the heating element is uniform over an entire surface or, in other words, so that a heating temperature of the heating element having the substantially rectangular plate-like part is uniform and, at the same time, the heat loss of the heating element, that is energized and heated, can be inhibited as much as possible so as to improve transferability to the molded product and, moreover, the molding process can be performed with a reduced cycle time by quickly cooling a resin material in a cavity to a controlled temperature of the die via the heating element that is de-energized and not heated.

In order to achieve the above object, there is provided a molding die for molding a molded product wherein a heating element that is substantially rectangular and that is energized to generate heat through electric resistance heating is provided on either one or both of a specular surface of a specular plate of one die and a specular surface of a specular plate of the other die disposed opposite to the specular surface of the specular plate of the one die and a resin material is supplied between the one die and the other die, the molding die comprising: the specular plates that are disposed on the one die and/or said other die and that are kept at a temperature at which at least a surface of the resin material can be cooled; the heating element having a substantially rectangular plate-like part that generates heat at least while being separated from the specular surfaces of the specular plates; heating element holders having abutting surfaces on which said heating element abuts when said heating element is separated from the specular surfaces of the specular plates; and a moving means for moving said heating element so that the heating element abuts on either one of the specular surface of the specular plate and the abutting surfaces of the heating element holders.

Further, said heating element is desirably comprised of a transfer plate on which a transferring pattern is formed and the transfer plate generates heat through electric resistance heating by energization.

Still further, said heating element is desirably comprised of a plate-like element that is provided independently of a transfer plate on which a transferring pattern is formed and said plate-like element generates heat through electric resistance heating by energization.

Still further, the heating element holders are desirably provided on the specular surface of said specular plate in a protruding manner so as to enclose said heating element.

Still further, the heating element holders are desirably formed of an electroconductive material to which electric wires are connected and, when said heating element abuts on the abutting surfaces of said heating element holders, said heating element can be energized via said heating element holders.

Still further, the moving means is desirably at least comprised of: a pressure reducing means for evacuating a space defined at least by the back of said heating element, the inner circumferential sides of the heating element holders and the specular surface of the specular plate so that said heating element is moved from a position where said heating element abuts on the abutting surfaces of the heating element holders disposed on the specular surface of the specular plate to another position where said heating element can abut on the specular surface of the specular plate; and a pressure increasing means for pressurizing the entire back of said heating element and said space for moving said heating element from the position where the heating element abuts on the specular surface of the specular plate to the position where the heating element abuts on the abutting surfaces of the heating element holders.

As described above, in a preferred configuration, as the heating element can be moved so that the heating element is separated from the specular surface of the specular plate and abuts the abutting surfaces of the heating element holders and also is separated from the abutting surfaces of the heating element holders and abuts the specular surface of the specular plate, the heating efficiency and cooling efficiency of the heating element can be demonstrated optimally.

Still further, cooling/heating means are desirably provided on the specular plate of the one die and on the specular plate of the other die.

In the configuration described above, the time to cool or heat the resin material in the cavity can be reduced.

Still further, connection terminals, each of which has a biasing means, are desirably disposed at both opposite ends of the heating element and at least a portion of the moving means for separating the heating element is constituted by inserting said connection terminals into the one die and/or the other die.

In the configuration described above, as the abutting surfaces of the connection terminals, having the biasing means such as springs, are pressed against the back of the heating element, the heating element can abut on the abutting surfaces of the heating element holders stably and, at the same time, as the both ends of the heating element are formed of an electroconductive material, contact points between the abutting surfaces of the heating element holders and the heating element can be formed without contact resistance and, therefore, a current flowing in the heating element can be controlled stably and the heating efficiency of the heating element can be increased.

Still further, the heating element is desirably energized by connecting electric wires to the connection terminals and pressing the abutting surfaces of the urged connection terminals against the heating element.

In the configuration described above, as the abutting surfaces of the connection terminals, which have the biasing means such as the springs and which are formed of the electroconductive material, can be pressed against the back of the heating element stably without need to install the connection terminals on the heating element in a fixed manner, the heating element can be energized without contact resistance. As a result, it is not necessary to provide the heating element holders, that are electroconductive and are formed at the both ends of the heating element, and the current density in the heating element can be kept substantially uniform by controlling the arrangement of the connection terminals and, thus, the temperature of the heating element can be controlled stably to be substantially uniform.

Still further, the biasing means of the connection terminals is desirably comprised of at least one or more of: a spring, an air cylinder, an oil hydraulic cylinder and an electromagnet.

In the configuration described above, the heating element can abut on the abutting surfaces of the heating element holders stably with the biasing force of the moving means for separating the heating element from the specular plate by actuating the spring, the air cylinder, the oil hydraulic cylinder or the electromagnet that are buried in the specular plate of the die at the side where the heating element is disposed. Moreover, when the air cylinder, the oil hydraulic cylinder or the electromagnet are allowed to move freely, the heating element can be moved from the position at which the heating element abuts on the abutting surfaces of the heating element holders to the position at which the heating element abuts on the specular surface of the die at the side where the heating element is disposed by sucking the heating element by air.

Still further, the connection terminals having the biasing means and/or the pressure increasing means desirably constitute a product pushing device.

In the configuration described above, the low-cost product pushing device can be provided without need to dispose a dedicated ejector device in the die.

Still further, there is provided a molding method for molding a molded product wherein a heating element that is substantially rectangular, and that is energized to generate heat through electric resistance heating, is provided on either one or both of a specular surface of a specular plate of one die and a specular surface of a specular plate of the other die disposed opposite to the specular surface of the specular plate of the one die and a resin material is supplied between the one die and the other die, the method comprising the steps of: when the molding dies are opened, moving the heating element having a substantially rectangular plate-like part by a moving means so that the heating element is separated from the specular surface of the specular plate, which is provided on said one die and/or said other die and which is kept at a temperature at which a surface of the resin material can be cooled, and abuts on abutting surfaces of heat element holders disposed on the die to which said specular plate is attached and, when said heating element abuts on said abutting surface, energizing said heating element to increase the temperature of the heating element; then, before the resin material is supplied, moving said heating element by the moving means so that said heating element abuts on the specular surface of said specular plate and, then, supplying the resin material into a cavity and, then, forming and molding the resin material by said heating element that is heated; de-energizing said heating element; and cooling the molded resin material via said heating element by employing the specular plate, said specular surface of which is maintained at a temperature lower than the surface temperature of said resin material.

Still further, in the molding method mentioned above, when the cooling process of the molded resin material is concluded, the temperature of the heating element is desirably higher than the temperature of the specular plate of the die at the side where the heating element is disposed.

As described above, in such molding method, the heating efficiency and the cooling efficiency of the heating element can be demonstrated optimally. In particular, the heating element can be heated to a predetermined temperature quickly by isolating the heating element from the specular plate of the die at the side where the heating element is disposed. Then, immediately before the dies are closed completely, the hot heating element is moved by the moving means so that the heating element abuts on the specular surface of the specular plate of the die at the side where the heating element is disposed and, immediately after that, the resin material is supplied to the cavity. As a result, as the heating element is heated, the flowability and formability of the resin material on the surface of the heating element can be increased and, moreover, even a molded product having a small thickness and a relatively large area can be formed and molded, over the entire area up to the outer edge, smoothly. Further, after the resin material is supplied to the cavity completely, the electric power is turned off so that the molded product can be cooled quickly to a predetermined controlled temperature of the specular plate of the die at the side where the heating element is disposed. Here, when the molded product is cooled completely, the temperature of the heating element is substantially identical to the heat dissipation temperature and higher than the temperature of the specular plate of the die at the side where the heating element is disposed. Therefore, it is possible to provide a molding method that can reduce the time to cool the resin material in the cavity and can produce high-quality molded product with a reduced production cycle time.

DESCRIPTION OF THE PREFERRED
EMBODIMENTS

Figure 1:
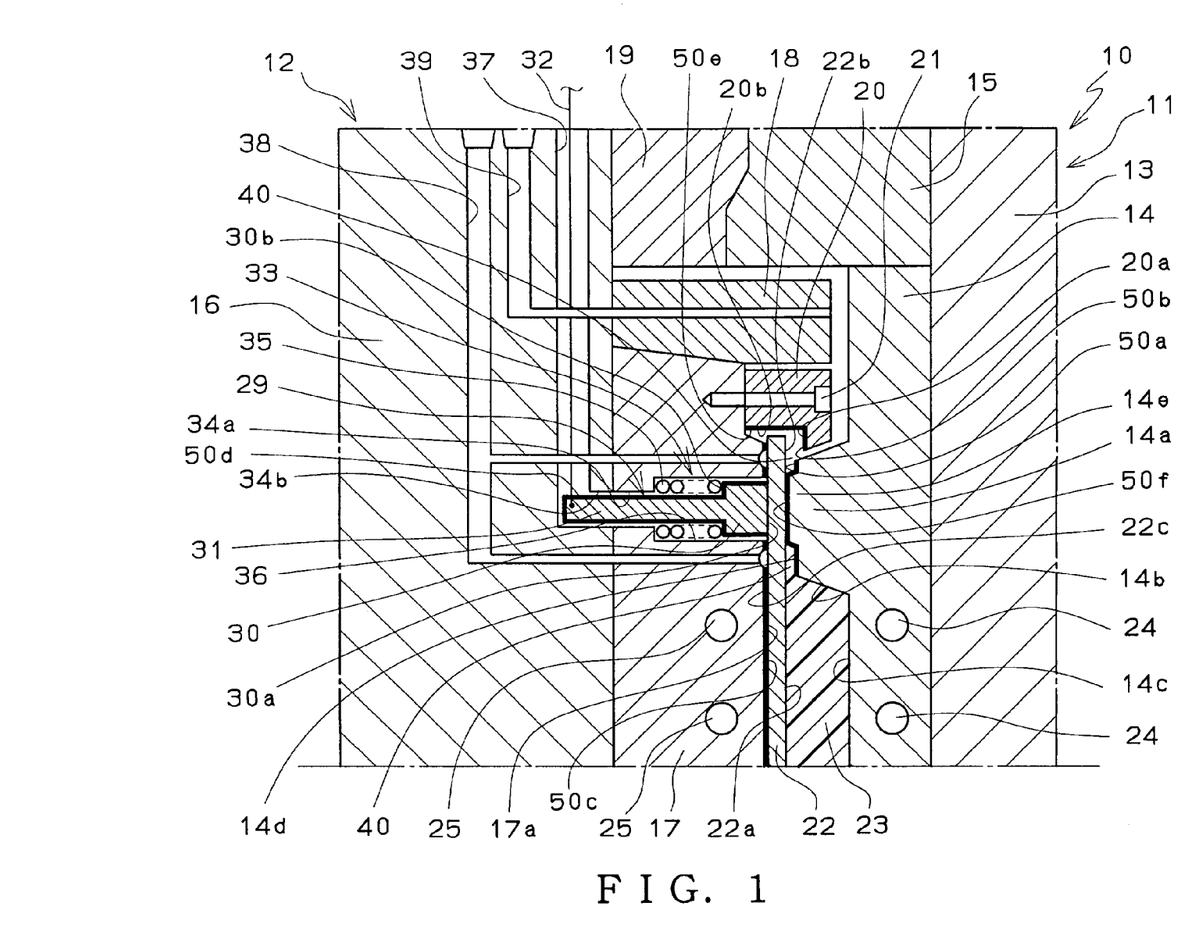
FIG. 1 is a cross-sectional view of principal parts of a molding die according to the present invention when the die is closed.
Figure 2:
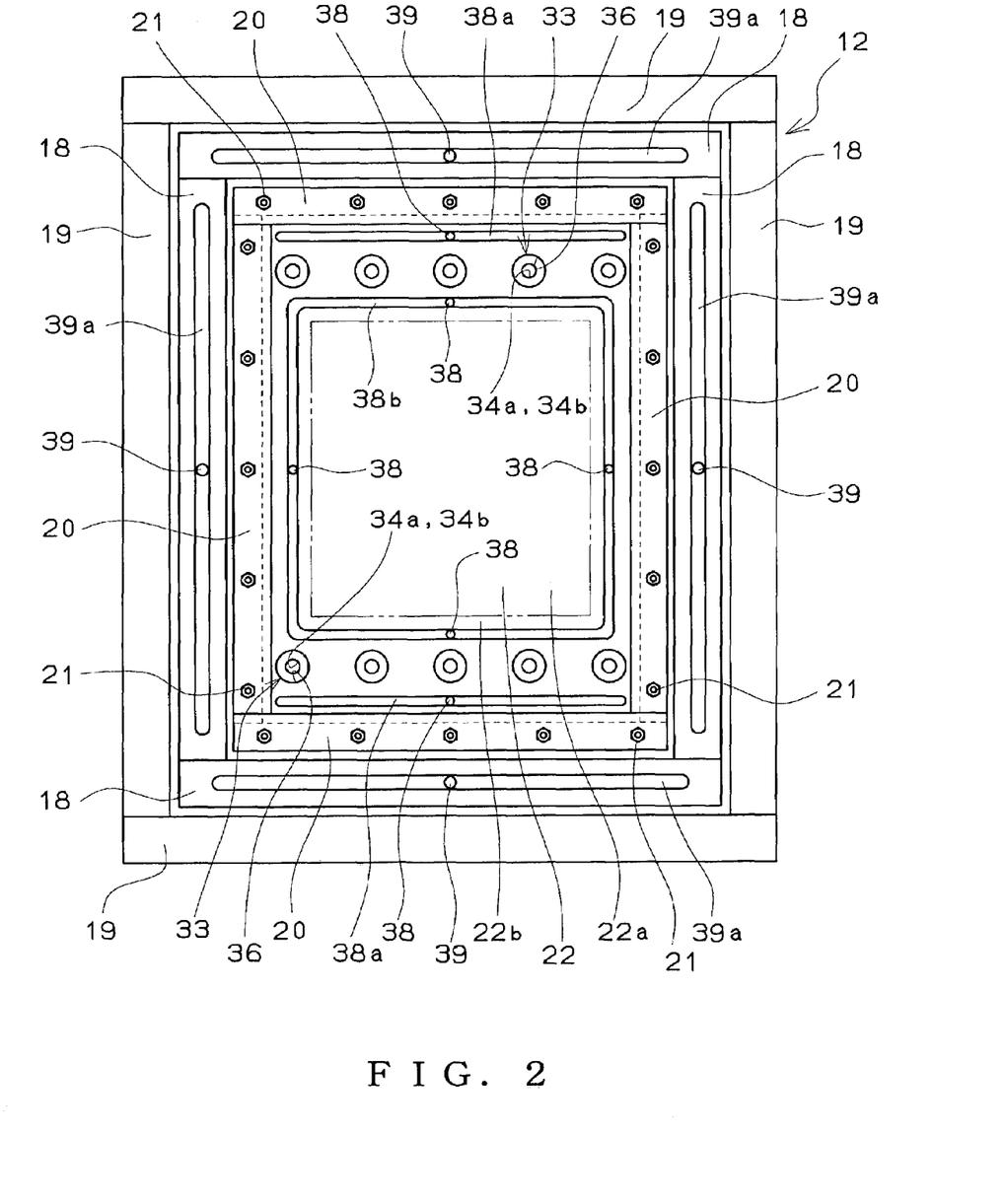
FIG. 2 is a diagram showing a movable die shown in FIG. 1 when viewed from the side of a stationary die.
Figure 3:
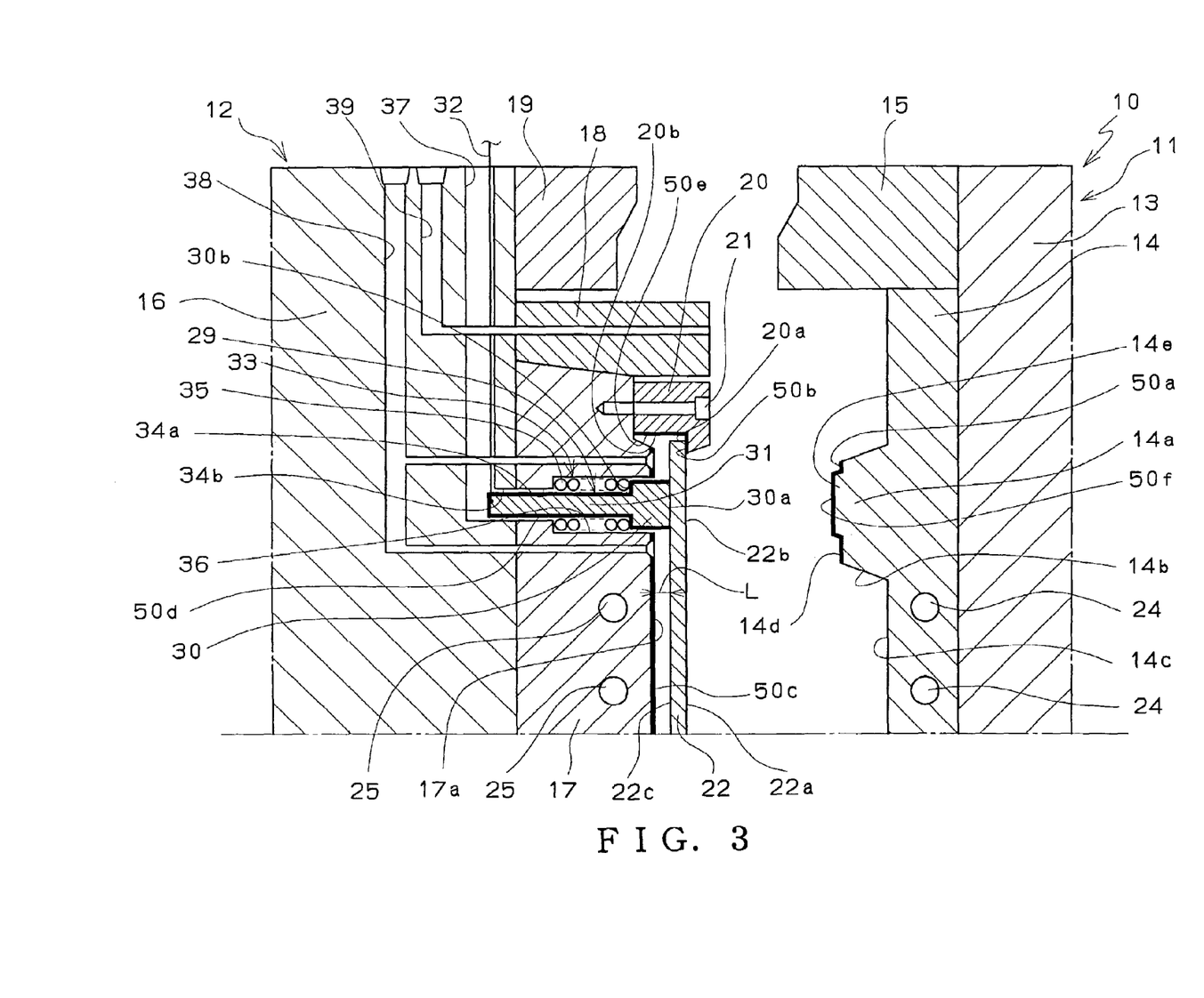
FIG. 3 is a cross-sectional view of the principal parts of the molding die shown in FIG. 1 when the die is opened.
Figure 4:
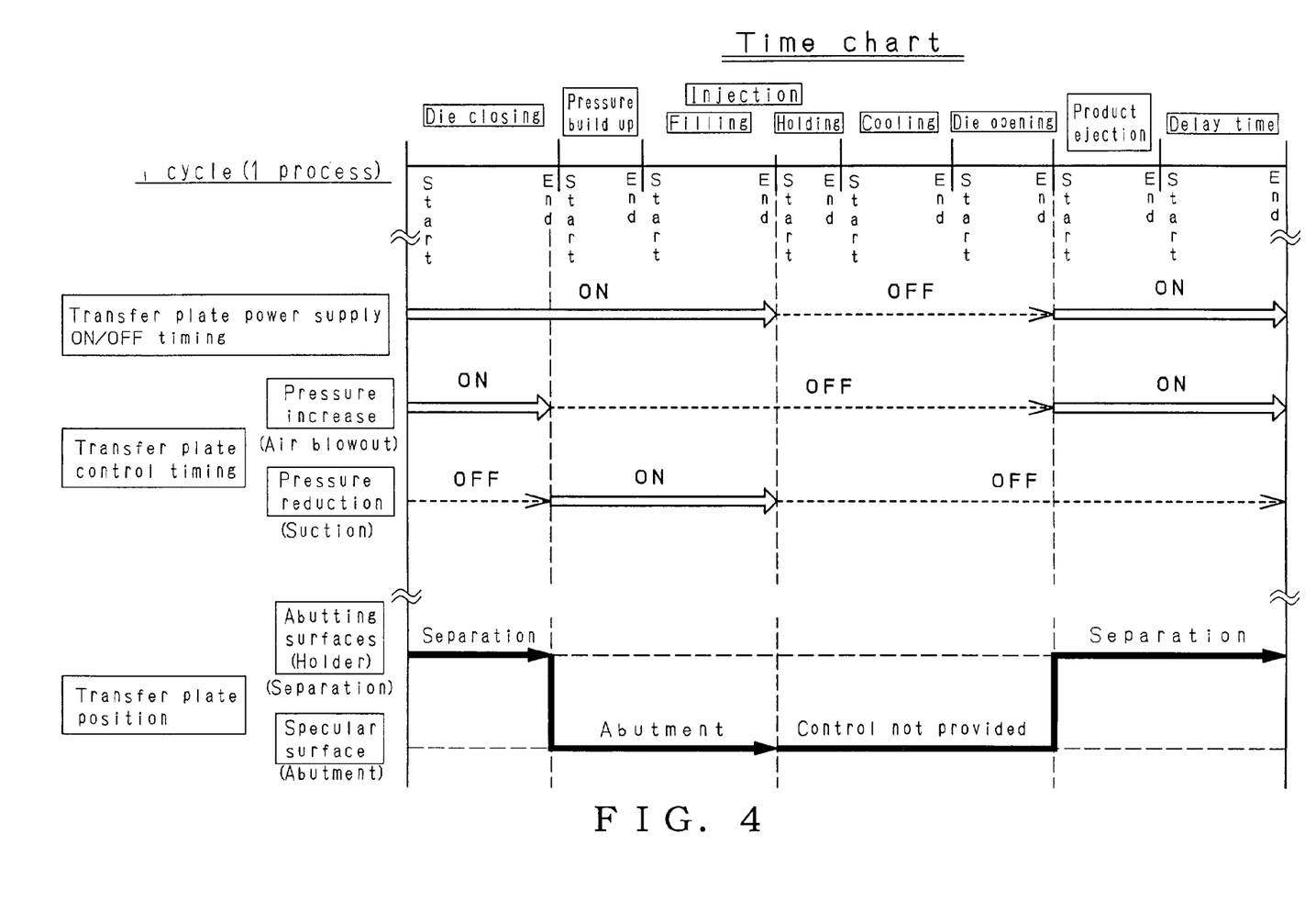
FIG. 4 is a time chart showing when a transfer plate is energized or de-energized and when a moving means operates so that the transfer plate abuts on a specular surface or is separated from the specular surface.

Hereinafter, a first embodiment of the present invention will be described in detail with reference to the drawings. FIG. 1 is a diagram for describing the embodiment of the present invention, which is a cross-sectional view of principal parts of a molding die 10 for injection molding when the die is closed. FIG. 2 is a diagram showing a movable die 12 of the molding die 10 when viewed from the side of a stationary die 11. FIG. 3 is a cross-sectional view of the principal parts when the molding die 10 is opened. FIG. 4 is a time chart showing when a transfer plate 22, which acts as a heating element in this embodiment of the present invention, is energized or de-energized or how a moving means operates so that the transfer plate 22 can abut on a specular surface. In this embodiment of the present invention, the transfer plate 22 for a light guide panel, which is made of nickel, on which a transferring pattern is formed and which generates heat through electric resistance heating by energization, is used as the heating element that is comprised of a substantially rectangular plate-like part. However, the heating element having a substantially rectangular plate-like part may be configured by applying a metallic plate-like element or a thin rubber heater, which is electrically insulated from the transfer plate 22 and which generates heat through electric resistance heating, to the back 22c of the transfer plate 22 which, in itself, is not energized. Further, both the transfer plate 22 and said metallic plate-like element may be energized so that both may generate heat through electric resistance heating.

The molding die 10 for injection molding shown in FIG. 1 is comprised of: the stationary die 11 that is attached to a stationary platen (not shown); and the movable die 12 that is opposite to said stationary die 11 and attached to a movable platen (not shown). Then, by driving a die opening/closing device of an injection molding apparatus (not shown), said movable platen is moved to match the movable die 12 with the stationary die 11. More specifically, the stationary die 11 is comprised of: a stationary die mounting plate 13; a first specular plate 14 that is rectangular and that has protrusions 14a provided in a protruding manner toward the movable die 12 so as to form a cavity 23 when the stationary die 11 is matched with the movable die 12; and a stationary frame 15. On the other hand, the movable die 12 is comprised of: a movable die mounting plate 16; a second specular plate 17 that is rectangular; four holders 18 for attaching the second specular plate 17; four movable frames 19; the transfer plate 22; four heating element holders 20 against which the transfer plate 22 abuts; and a plurality of bolts 21 for attaching the four heating element holders 20 to the second specular plate 17. Further, when the stationary die 11 and the movable die 12 are closed with respect to each other, a non-transferring surface 22b of the transfer plate 22 abuts abutting parts 14e of the protrusions 14a formed on the first specular plate 14 and, still further, in the molding die 10 for injection molding, the cavity 23 is defined by a cavity forming side specular surfaces 14b of the protrusions 14a formed on the first specular plate 14, a specular surface 14c of the first specular plate 14 and the transfer plate 22. At this time, a transfer surface 22a of the transfer plate 22 that is comprised of a substantially rectangular plate-like part on which the transferring pattern is formed is located in the cavity 23 and, on the other hand, the non-transferring surface 22b lies outside the cavity and extends to outer peripheral end of the transfer plate 22. Still further, the first specular plate 14 and the second specular plate 17 are provided with a plurality of holes 24 and 25 for disposing therethrough a plurality of channels, heaters or other elements for temperature controlling the first specular plate 14 and the second specular plate 17, respectively, and, further, a cooling/heating means is formed by circulating media through the plurality of holes 24 and 25 or by burying heaters therein. Further, a first specular surface 14c of the first specular plate 14 and a second specular surface 17a of the second specular plate 17 can be temperature controlled so that the surface of a resin material injected into the cavity 23 can be cooled. Here, a description about an ejector device for pushing out a molded product, which will be given later, is omitted. Further, it is to be noted that the present invention can be applied not only to injection molding apparatus but also to other molding apparatuses and, in such case, a sprue bush, runners, gates and other elements for introducing the melted resin into the cavity 23 are not necessarily provided in the molding die 10 and, therefore, such elements are not shown in the drawings.

Next, this embodiment will be described in detail with reference to FIGS. 1 and 2. The movable die 12 contains connection terminals 29, formed with each connection terminal 29 made of copper and comprised of a cylindrical small diameter part 31, to which an electric wire is connected, and a cylindrical large diameter part 30 and, in each connection terminal 29, a step part 30b is provided at the boundary between the small diameter part 31 and the large diameter part 30. Then, springs 35 acting as biasing means are inserted around the small diameter parts 31 of the connection terminals 29 so that the springs 35 push the connection terminals 29 at the step parts 30b toward the stationary die 11. Further, the second specular plate 17 of the movable die 12 is provided with insertion holes 34a for inserting the small diameter parts 31 of the connection terminals 29 and holes 36 for housing the large diameter parts 30 of the connection terminals 29 and the springs 35. Still further, the movable die mounting plate 16 is provided with insertion holes 34b, each of which has the same diameter and the same center axis as each of the insertion holes 34a and through which the small diameter parts 31 of the connection terminals 29 can be inserted slidably, and holes 37, through which the electric wires 32 connected to the small diameter parts 31 of the connection terminals 29 can move as the connection terminals 29 are moved. Still further, these holes 36, 37 and the insertion holes 34a, 34b constitute each of housing parts 33 for housing the connection terminals 29 and the springs 35.

Further, the four heating element holders 20 that have respective abutting surfaces 20a, on which the non-transferring surface 22b of the transfer plate 22 abuts, and which surround the transfer plate 22, are provided on the second specular plate 17 of the movable die 12 in a protruding manner. Here, note that it may not be always necessary to dispose the heating elements holders 20 on the second specular plate 17, provided that the movable die 12 is provided with the heating element holders 20. Still further, in the movable die 12, five housing parts 33 for housing the connection terminals 29 and the springs 35, are provided on each of opposite ends of the transfer plate 22 (ten housing parts 33, in total, at both ends, which are opposed to each other and can be electrically connected), and are spaced at substantially equal distances. Then, the connection terminals 29 having the biasing force due to the springs 35 are disposed in the housing parts 33 to press abutting surfaces 30a of the large diameter parts 30 of the connection terminals 29 against the back 22c of the transfer plate 22 so that the transfer plate 22 is separated from the specular surface 17a of the second specular plate 17 and abuts on the abutting surfaces 20a of the heating element holders 20. After that, the abutting surfaces 30a are pressed against the back 22c of the transfer plate 22 continuously so that contact resistance may not occur even when the non-transferring surface 22b of the transfer plate 22 abuts on the abutting surfaces 20a of the heating element holders 20 and so that the transfer plate 22 can be energized.

Here, the heating element, which abuts on the abutting surfaces 20a of the heating element holders 20, may alternatively be configured by holding the outer edge part of the transfer plate 22 acting as the plate-like part by another transfer plate holding member. In this case, the transfer plate 22 and the transfer plate holding member constituting said heating element are separated from the specular surface 17a of the second specular plate 17 so that the transfer plate holding member abuts on the abutting surfaces 20a of the heating element holders 20. In such example, the surface regions of the transfer plate holding member, which abut the heating element holders 20, are formed as insulating layers. Further, in such configuration, the heating element having the substantially rectangular plate-like part may be energized by the electric power supplied to the transfer plate 22 directly or via the transfer plate holding member. Still further, the heating element holders 20 are not always disposed at the side to be separated from the specular surface 17a of the second specular plate 17. For example, a portion of the transfer plate holding member may be inserted inside the second specular plate 17 or the movable die mounting plate 16 and its forward movement may be restricted by an abutting surface provided inside said second specular plate 17 or the movable die mounting plate 16.

Here, considering the effect that the transfer plate 22 may expand or contract due to heat when the transfer plate 22 is energized to generate heat or de-energized to be cooled or, further, when the transfer plate 22 is heated or cooled at the melted resin temperature or the controlled temperature of the die, it is to be noted that the abutting surfaces 30a of the connection terminals 29 are not secured to the back 22c of the transfer plate 22 but are configured to abut thereon in this embodiment. Further, in this embodiment, the shape, arrangement and number of the connection terminals 29 may be determined in consideration of the size and shape of the transfer plate 22 so that the current density is substantially uniform across the transfer plate 22 or, in other words, the heating temperature is distributed substantially uniformly across the transfer plate 22. However, as an uneven temperature distribution in the transfer plate may be preferred for some molded products or in some molding conditions, though such embodiments are not shown specifically here, the arrays of the connection terminals may be arranged opposed to each other like hyperbolas or parabolas or the connection terminals may be arranged at irregular intervals so that a molding which has been impossible in the prior art can be implemented. Further, the connection terminals 29 and the abutting surface 20a of the heating element holders 20 may be disposed so that the connection terminals 29 are opposed to the abutting surface 20a of the heating element holders 20 via the transfer plate 22. Still further, considering the heating efficiency of the transfer plate 22 and other factors, when the transfer plate 22 is separated from the specular surface 17a of the second specular plate 17 and abuts on the abutting surfaces 20a of the heating element holders 20, a distance L (FIG. 3) from the specular surface 17a of the second specular plate 17 to the back 22c of the transfer plate 22 must be 5 mm or more. However, a distance L of 1 mm or more may be sufficient if the transfer plate 22 has adequate stiffness so that its center part is not deflected.

Further, the movable die 12 is provided with air suction/pressurization channels 38 for moving the transfer plate 22 so that the transfer plate 22 abuts on the specular surface 17a. Then, grooves 38a, 38a, which are provided on the specular surface 17a in the neighborhood and on the outer circumferential side of the ten holes 36 for housing the large diameter parts 30 of the connection terminals 29 to supply electric power to the both ends of the transfer plate 22, and a groove 38b, which is provided on the specular surface 17a so that it is positioned on the underside of the non-transferring surface 22b of the transfer plate 22 formed to enclose the transfer surface 22a and, at the same time, on the underside of the protrusions 14a of the first specular plate 14, are disposed and connected to the respective ones of air suction/pressurization channels 38. Then, a vacuum pump, which constitutes a pressure reducing means provided on the outside of the movable die 12 for removing air from the space on the back of the transfer plate 22 so that the transfer plate 22 abuts on the specular surface 17a, and a pump, which constitutes a pressure increasing means for supplying compressed air to pressurize the back 22c of the transfer plate entirely as well as the space defined by the back 22c of the transfer plate 22, an inner circumferential side surfaces 20b of the heating element holders 20 and the specular plate 17 so that the transfer plate 22 is separated from the specular surface 17a, are connected to openings of the suction/pressurization channels 38 in the movable die mounting plate 16. Then, said pressure increasing means and pressure reducing means are controlled via electromagnetic switching valves (not shown). Thus, a moving means for moving the transfer plate 22 so that it abuts on either the specular surface 17a or the abutting surfaces 20a of the heating element holders 20 is comprised of said pressure increasing means, pressure reducing means, biasing means, the die opening/closing device for applying force in the direction opposite to the force of the biasing means, and so on. Here, the moving means may be comprised of the pressure increasing means and the pressure reducing means only, or the pressure reducing means and the biasing means only. Then, the heating element can be moved at an arbitrary time by using the pressure increasing means and the pressure reducing means or the biasing means comprised of an actuator, as the moving means. Further, the moving means may be based on only the biasing force of the spring contracted by the opening/closing operation of the die opening/closing device, which may be driven by the die opening/closing device in an interlocking manner.

Still further, on the protrusions 14a of the first specular plate 14, abutting parts 14e, each of which is substantially square and has a length somewhat larger than the diameter of the large diameter parts 30 of the connection terminals 29 provided to be pressed against the back 22c of the transfer plate 22, are formed so that the abutting parts 14e protrude 5 micro meter–20 micro meter further from tip surfaces 14d of the protrusions 14a of the first specular plate 14. Then, the abutting parts 14e are disposed at the 10 positions where the large diameter parts 30 of the connection terminals 29 are disposed so that the abutting parts 14e abut on the non-transferring surface 22b of the transfer plate 22 when the die is closed. In such configuration, the current density in the heating element having the substantially rectangular plate-like part that generates heat through the electric resistance heating can be constant across the entire surface and, therefore, the heating temperature of the heating element can be kept uniform. Further, when the die is closed and the abutting parts 14e of the protrusions 14a of the first specular plate 14 abut on the non-transferring surface 22b of the transfer plate 22, vents 40, which are clearances of 5 micro meter–20 micro meter between the tip surfaces 14d and the non-transferring surface 22b of the transfer plate 22, are formed so that the suction/pressurization channels 39 provided in the movable die 12 are connected to the cavity 23 via the grooves 39a provided at the openings of the holders 18. Then, when the melted resin is injected into the cavity 23, these vents 40 and suction/pressurization channels 39 may be used to discharge air in the cavity or volatile gas generated from the melted resin to the outside of the die or to supply compressed air from the outside of the die to remove the molded product from the transfer plate 22. Here, a vacuum pump for aspirating the air, volatile gas and so on and a pump for supplying the compressed air, which are provided on the outside of the movable die 12 along with electromagnetic switching valves (not shown), are connected to the openings of the suction/pressurization channels 39 of the movable die mounting plate 16.

In the molding die 10 configured as described above, on the entire surfaces of the tip surfaces 14d and the abutting parts 14e of the protrusions 14a of the first specular plate 14 of the stationary die 11, the abutting surfaces 20a and the inner circumferential sides 20b of the heating element holders 20, the entire surfaces of the connection terminals 29 except for the abutting surfaces 30a and the specular surface 17a of the second specular plate 17, insulating layers 50a–50f, such as a ceramic coating and a sapphire coating, are formed to protect each member from leakage current from the energized transfer plate 22.

Further, the transfer plate 22 is energized via the connection terminals 29, 29 using an AC or DC power supply of 1–5 V, 100–500 A, wherein the heating temperature of the transfer plate 22 can be determined by controlling the current.

In the embodiment of the present invention, a light guide panel of 15 inch diagonal size×2 mm thickness is actually molded from polycarbonate resin using the transfer plate 22 of 33 cm length×40 cm width×0.03 cm thickness, on which transferring pattern is formed, and an injection molding apparatus having clamping force of 280 tons. The molding conditions are as follows. When the heating temperature of the transfer plate 22 is set to 150° C., the first specular plate 14 of the stationary die 11 is temperature controlled to 80° C. at which at least the surface of the resin material can be cooled, the second specular plate 17 of the movable die 12 is temperature controlled to 50° C. which is lower than the heating temperature of the transfer plate 22, and the transfer plate 22 abuts on the abutting surfaces 20a of the four heating element holders 20, the molding operation is carried out by controlling the current flowing through the transfer plate 22 so that the temperature of the transfer plate 22 is increased from the initial temperature 80° C. to the target temperature 150° C. for 5 seconds with a supplied electric power of 2.2 kw and, by maintaining the temperature of 150° C. thereafter. Here, though the second specular plate 17 is temperature controlled to 50° C., when the cooling process is concluded, the temperature of the transfer plate 22 is not reduced to 50° C. but is actually reduced to about 80° C. Therefore, the first specular plate 14 of the stationary die 11 is also temperature controlled to 80° C. so that the cavity forming surfaces of the two dies are at approximately the same temperature.

Hereinafter, a molding method according to the present invention will be described with reference to FIGS. 1–4 and, in particular, the time chart shown in FIG. 4. During 1–2 shots after the molding process is started, the transfer plate 22 is not energized and the products are molded by evacuating the suction/pressurization channels 38 so that the transfer plate 22 adheres to the specular surface 17a of the second specular plate 17.

After that, the die is opened by the mold opening/closing device (not shown) and, then, when the product ejection process is started, at the approximately same moment as the die is opened, the transfer plate 22, which has been pressed against the specular surface 17a of the second specular plate 17 by the molded product, is separated from the specular surface 17a and moved to the abutting surfaces 20a of the four heating element holders 20 by the ejector mechanism, that acts as the product pushing device and is implemented through cooperation between the biasing force of the ten springs 35 disposed around the ten connection terminals 29 installed in the movable die 12, which is accumulated when the die is closed, and the pressurizing force applied to the back 22c of the transfer plate 22 by the pressure increasing means implemented by the compressed air supplied from the suction/pressurization channels 38 disposed inside the movable die 12. Thus, in the configuration described above, the moving means is constituted by the biasing means and the pressure increasing means. Then, the product is ejected at the same time as the space is defined by the back 22c of the transfer plate 22, the inner circumferential sides 20b of the heating element holders 20 and the specular surface 17a of the second specular plate 17. Further, at approximately the same time as the product ejection process is started, while the non-transferring surface 22b of the transfer plate 22 is still in abutment with the abutting surfaces 20a of the heating element holders 20, the transfer plate 22, which has been cooled to about 80° C., is energized immediately so that the temperature of the transfer plate 22 is increased from 80° C. to 150° C. for about 5 seconds and, then, the energizing current is controlled so as to keep the heating temperature of the transfer plate 22 at 150° C.

Then, after the product ejection process and a delay time, the electromagnetic switching valve (not shown) is switched from the pressure increasing mode, in which compressed air is supplied to the space on the back 22c of the transfer plate 22 before the resin material is supplied to the cavity just before the die is closed completely, to the pressure reducing mode, in which the space defined by the back 22c of the transfer plate 22, the inner circumferential sides 20b of the heating element holders 20 and the specular surface 17a of the second specular plate 17 is evacuated through the suction/pressurization channels 38 and, on the other hand, with the die closing operation, the non-transferring surface 22b of the transfer plate 22 is pressed against the abutting parts 14e of the first specular plate 14 of the stationary die 11 so as to compress the springs 35 acting as the biasing means so that the transfer plate 22 abuts on the specular surface 17a of the second specular plate 17. Then, after the die clamping and pressure build up process, the melted polycarbonate resin is injected and filled from a nozzle of an injection molding device (not shown) through a sprue, a runner and a gate (also not shown) into the cavity 23 at a low pressure. At this time, as the transfer plate 22 is heated to 150° C., the flowability of the melted resin can be increased so that, even when a molded product having a small thickness and a relatively large surface area is produced as in this embodiment, the melted resin can flow to the outermost region of the cavity 23 to be shaped and molded smoothly. Next, during a period including a holding period before the injection process is completed, the transfer plate 22 is de-energized and, more specifically, in this embodiment, the transfer plate 22 is de-energized at the same time as the holding step is started after the melted resin is filled completely so that the molded product is quenched via the transfer plate 22 at the controlled temperature of the second specular plate 17, which is set at 50° C. At this time, as the back 22c of the transfer plate 22 is pressed against the specular surface 17a of the second specular plate 17 continuously due to the pressure kept at a constant level, the operation to suck the air is stopped at the same time as the holding step is started. Then, after the holding step and the cooling step are completed, the die is opened to complete one cycle of the molding operation. This operational cycle is an example for describing this embodiment and an actual operational cycle may differ from this example.

As described above, according to this embodiment, as the transfer plate 22 can be pressed against the abutting surfaces 20a of the heating element holders 20 stably by said moving means, the transfer plate 22 can be energized via the ten connection terminals 29 so that the contact resistance does not occur between the abutting surfaces 30a of the connection terminals 29 and the back 22c of the transfer plate 22. Further, by suctioning the transfer plate 22 pneumatically at the same time as the die is closed, the biasing force of the springs 35 can be enhanced and the transfer plate 22 can be pressed against the abutting surfaces 20a of the heating element holders 20 more stably. Here, it is to be noted that the transfer plate 22 is moved pneumatically and adheres to the specular surface 17a of the second specular plate 17 so that the transfer plate 22 may not be displaced by the pressure of the flowing resin when the melted resin is injected into the cavity. Further, instead of using the biasing force of the springs 35 and the connection terminals 29 to energize the transfer plate 22, the transfer plate 22 having electroconductive copper members attached at the both ends across the longitudinal sides of the transfer plate 22 and electric wires connected to the respective copper members may be used, wherein the connection terminals 29 may not be used but the transfer plate 22 may be provided with the air vents only. Thus, as it is not necessary to attach the connection terminals, to which the electric wires are connected, to the heating element fixedly, the expansion or contraction effect of the heating element due to heating or cooling can be accommodated satisfactorily.

Though the molded product is actually produced from polycarbonate resin in this embodiment, the molding conditions may differ depending on the properties and characteristics of each resin and, therefore, the heating temperature of the transfer plate 22 and the controlled temperatures of the first specular plate 14 and the second specular plate 17 may be controlled by the controller acting as a control means preferably depending on the types of resin materials or according to the change of environmental conditions and the like in each molding operation.

Though the moving means for separating the transfer plate 22 is constituted by the biasing means comprising the springs and the air pressure increasing and reducing means in the embodiment described above, the biasing means may be constituted by at least one of an air cylinder, an oil hydraulic cylinder, an electromagnet and the like, which are embedded in the second specular plate 17 of the movable die 12 and which has a copper connection terminal that is secured to a rod tip portion, wherein the electric wires 32 are connected to the connection terminal. In particular, as the air cylinder, the oil hydraulic cylinder or the electromagnet is disposed on the second specular plate 17 or the movable die mounting plate 16 and the transfer plate 22 can be separated from the second specular plate 17 with the help of the abutting surface 30a of the connection terminal 29 secured to the rod tip portion and the like of the air cylinder, the oil hydraulic cylinder or the electromagnet, the non-transferring surface 22b can abut on the abutting surfaces 20a of the heating element holders 20 stably. Further, the moving means may also be configured so that the air cylinder, the oil hydraulic cylinder or the electromagnet is allowed to move freely and the heating element can be moved from the abutting surfaces 20a of the heating element holders 20 to abut on the specular surface 17a of the second specular plate 17 by moving the heating element pneumatically.

Though not shown specifically, the present invention may also be applied to a transfer molding process using a press molding apparatus. The press molding apparatus has a upper die secured to a stationary platen and a lower die secured to a movable platen, wherein a plurality of connection terminals 29 to which springs 35 are attached as shown in FIG. 2, four heating element holders 20, a transfer plate 22 and, further, air suction/pressurization channels 38 which function as the moving means for moving the transfer plate 22, and the like, are disposed on the upper die. Then, a resin material that consists of a resin plate or melted resin mounted on the lower die can be molded so that a transferring pattern is transferred from the transfer plate 22 that has been heated onto the resin plate by clamping the upper and lower dies by a clamping cylinder to which the movable die is attached. Further, the present invention may be applied not only to such molding process, but also to an injection compression molding process and a shaping molding process wherein the movable die 12 is moved toward the stationary die 11 after the melted resin is injected so as to compress the melted resin.

Next, a second embodiment of the present invention will be described with reference to FIGS. 1–4, which have been used for describing the first embodiment. In the second embodiment, the transfer plate 22 is energized to generate heat via the heating element holders 20 by abutment between the abutting surfaces 20a of the heating element holders 20, which are made of copper and to which the electric wires are connected, and the non-transferring surface 22b of the transfer plate 22. Thus, the second embodiment differs from the first embodiment only in that the heating element holders 20 made of copper, to which the electric wires are connected so that the heating element can be energized therethrough, and the connection terminals having the abutting surfaces 30c which abut on the back 22c of the transfer plate 22 and are covered with insulating layers such as ceramic coating, sapphire coating and the like, to which the electric wires 32 are not connected, are provided and the other members in the second embodiment are identical to the corresponding members in the first embodiment. Therefore, the transfer plate 22 can be energized when the both ends of the transfer plate 22, which acts as the heating element, abut on the abutting surfaces 20a of the heating element holders 20. Further, in particular, electric insulating layers 50b, 50b and 50e, 50e are formed on the abutting surfaces 20a, 20a and the inner circumferential sides 20b, 20b of the heating elements holders 20, 20 disposed on the both sides in parallel with the energizing direction of the transfer plate 22, respectively. In this connection, in the second embodiment wherein the transfer plate 22 is energized to generate heat by abutment between the abutting surfaces 20a of the heating element holders 20, which are made of copper and to which the electric wires are connected, and the non-transferring surface 22b of the transfer plate 22, when the resin material is supplied to the cavity, as the transfer plate 22 adheres to the specular surface 17a of the second specular plate 17 to be de-energized, the resin material can be shaped and, at the same time, cooled at a somewhat reduced temperature of the transfer surface 22a of the transfer plate 22.

In the second embodiment described above, though the moving means for moving the transfer plate 22 between the specular surface 17a and the abutting surfaces 20a of the heating element holders 20, so that the transfer plate 22 abuts on either one of them, is constituted by the means for separating the transfer plate 22, which is implemented through cooperation between the biasing force of the ten springs 35 and the pressure caused by ejecting air and also acts as the ejector mechanism, and the pressure reducing means by air suction, in an alternative embodiment (not shown), the moving means may be configured by embedding the air cylinder, the oil hydraulic cylinder or the electromagnet in the second specular plate 17 of the movable die 12, installing the copper connection terminals 29, to which the electric wires 32 are connected, on the rod tip portions and the like of the air cylinder, the oil hydraulic cylinder or the electromagnet fixedly and, further, bending the both ends of the transfer plate 22 so that the tip portions are secured to the connection terminals 29 so as to accommodate the expansion or contraction effect of the transfer plate 22 due to heat, wherein the reciprocating motion of the air cylinder, the oil hydraulic cylinder or the electromagnet allows the transfer plate 22 to be moved between the specular surface 17a of the second specular plate 17 and the abutting surfaces 20a of the heating element holders 20 so that the transfer plate 22 can abut on either one of them.

Thus, the first and second embodiments of the present invention are characterized in that the transferability to the molded resin material can be increased and the molding cycle time can be reduced and, on the other hand, the ejector mechanism is constituted through cooperation between the biasing force of the ten springs 35 and the pressure caused by ejecting air, wherein, in the state in which the transfer plate 22 that is heated by the electric resistance heating is separated slightly from the specular surface 17a of the second specular plate 17 of the movable die 12 and, then, the transfer plate 22 is energized so that the transfer plate 22 is heated uniformly, immediately before the die is closed, the transfer plate 22 is allowed to adhere to the specular surface 17a of the second specular plate 17 instantaneously and, at the same time, the melted resin is injected into the cavity 23 so that the flowability of the melted resin on the transfer surface 22a can be increased and, after that, at the same time as the holding step is started, the transfer plate 22 is de-energized so that the resin in the cavity 23 can be quenched at the controlled temperature of the second specular plate 17 that is lower than the heating temperature of the transfer plate 22 and the surface temperature of the resin material. However, the connection terminals 29 for energizing the transfer plate 22 may be fixedly installed on the transfer plate 22 so that the expansion or contraction effect of the transfer plate 22 due to heat can be accommodated. Further, the mechanism that is constituted by the transfer plate 22 that acts as the heating element in the present invention, the heating element holders 20, the moving means for separating the transfer plate 22 from the specular surface 17a, and the like, may be provided on the stationary die 11 or the both dies. Still further, the stationary die 11 and the movable die 12 can be replaced with one another. Thus, although not shown specifically, it is to be understood that the present invention is not limited to the embodiments described above, and should be interpreted that those described in or conceived from the drawings and the specification can be included in the invention.

As shown and described above, according to the present invention, as the transfer plate is energized in the state in which the heating transfer plate is separated slightly from the specular surface of the specular plate of at least one of the stationary die and the movable die, the transfer plate can be heated in a short time up to the heating temperature of the transfer plate, which is set higher than the controlled temperature of the specular plate. Further, after that, when the transfer plate abuts on the specular surface of the specular plate and the melted resin is supplied to the space between the dies immediately after the die is closed, as the transfer plate is heated at a temperature higher than the controlled temperature of the specular plate, the flowability of the melted resin on the transfer surface and the transferability to the melted resin can be increased, which is preferred for molding product having a small thickness and a relatively large area. Still further, when the transfer plate is de-energized, as the resin material is quenched by the specular plate that is lower than the heating temperature of the transfer plate, the molding cycle time can be reduced. The present invention may be applied not only to the injection molding process but also to the injection compression molding process, the shaping molding process or the press molding process, wherein, in the case of the press molding process, the transferability and shapeability of the resin plate and the like can be increased.

Further, when the moving means for separating the transfer plate is constituted by cooperation between the biasing force of the springs and the pressurizing force of the air blowout, the moving means can also be employed as the ejector mechanism for pushing out the product, which can be manufactured with a simpler mechanism and at a lower cost than the conventional ejector mechanism.

What is claimed is:

1. A molding die for molding a molded product wherein a heating element that is substantially rectangular and that is energized to generate heat through electric resistance heating is provided on either one or both of a specular surface of a specular plate of one die and a specular surface of a specular plate of the other die disposed oppositely to the specular surface of the specular plate of the one die and a resin material is supplied between the one die and the other die, the molding die comprising:

the specular plates that are disposed on said one die and/or said other die and that are kept at a temperature at which at least a surface of the resin material can be cooled;

the heating element having a substantially rectangular plate-like part that generates heat at least while being separated from the specular surfaces of said specular plates;

heating element holders having abutting surfaces on which said heating element abuts when said heating element is separated from the specular surfaces of said specular plates; and a moving means for moving said heating element so that the heating element abuts on either one of the specular surface of the specular plate and the abutting surfaces of the heating element holders.

2. A molding die according to claim 1, wherein said heating element is comprised of a transfer plate on which a transferring pattern is formed and said transfer plate generates heat through electric resistance heating by energization.

3. A molding die according to claim 1, wherein said heating element is comprised of a plate-like element that is provided independently of a transfer plate on which a transferring pattern is formed and said plate-like element generates heat through electric resistance heating by energization.

4. A molding die according to claim 1, wherein said heating element holders are provided on the specular surface of said specular plate in a protruding manner so as to enclose said heating element.

5. A molding die according to claim 1, wherein said heating element holders are formed of an electroconductive material to which electric wires are connected and, when said heating element abuts on the abutting surfaces of said heating element holders, said heating element can be energized via said heating element holders.

6. A molding die according to claim 1, wherein said moving means is at least comprised of: a pressure reducing means for evacuating a space defined at least by a back of said heating element, inner circumferential sides of said heating element holders and the specular surface of said specular plate so that said heating element is moved from a position where said heating element abuts on the abutting surfaces of the heating element holders disposed on the specular surface of the specular plate to another position where said heating element can abut on the specular surface of said specular plate; and a pressure increasing means for pressurizing the entire back of said heating element and said space for moving said heating element from the position where the heating element abuts on the specular surface of the specular plate to the position where the heating element abuts on the abutting surfaces of said heating element holders.

7. A molding die according to claim 1, wherein cooling/heating means are provided on the specular plate of said one die and on the specular plate of said other die.

8. A molding die according to claim 1, wherein connection terminals, each of which having a biasing means, are disposed at both opposite ends of said heating element and at least a portion of the moving means for moving said heating element is constituted by inserting said connection terminals into said one die and/or said other die.

9. A molding die according to claim 8, wherein said heating element is energized by connecting electric wires to said connection terminals and pressing the abutting surfaces of the biased connection terminals against said heating element.

10. A molding die according to claim 8, wherein the biasing means of said connection terminals is comprised of at least one or more of: a spring, an air cylinder, an oil hydraulic cylinder and an electromagnet.

11. A molding die according to claim 8, wherein said connection terminals having said biasing means and/or the pressure increasing means for pressurizing the entire back of said heating element and said space for moving said heating element from the position where the heating element abuts on the specular surface of the specular plate to the position where the heating element abuts on the abutting surfaces of said heating element holders, constitute a product pushing device.

* * * * *